United States Patent [19]

Donatelli et al.

[11] Patent Number: 5,442,027

[45] Date of Patent: Aug. 15, 1995

[54] MOISTURE CURABLE ORGANOSILOXANE COMPOSITIONS EXHIBITING EXTENDED WORKABILITY

[75] Inventors: Joan M. Donatelli; Daniel F. McMahon; Kent R. Larson, all of Midland, Mich.

[73] Assignee: Dow Corning Corporation, Midland, Mich.

[21] Appl. No.: 264,382

[22] Filed: Jun. 23, 1994

[51] Int. Cl.⁶ .............................................. C08G 77/08
[52] U.S. Cl. ...................................... 528/18; 525/477
[58] Field of Search ........................... 528/18; 525/477

[56] References Cited

U.S. PATENT DOCUMENTS 3,607,801  9/1971  Fulton .................................... 528/18
4,569,980  2/1986  Sasaki et al. ......................... 528/18

*Primary Examiner*—Melvyn I. Marquis
*Attorney, Agent, or Firm*—Robert Spector

[57] ABSTRACT

Low concentrations of a liquid silanol terminated polydiorganosiloxane with a number average molecular weight less than about 1000 extend the working time of tin-catalyzed moisture curable organosiloxane compositions without substantially decreasing the cure rate of the composition or adversely affecting the physical properties of cured materials, particularly elastomers, prepared using these compositions.

9 Claims, No Drawings

MOISTURE CURABLE ORGANOSILOXANE COMPOSITIONS EXHIBITING EXTENDED WORKABILITY

BACKGROUND OF THE INVENTION

1. Field of the Invention

This invention relates to moisture curable organosiloxane compositions. More particularly this invention relates to additives for organosiloxane compositions that cure by the reaction of silanol-containing polyorganosiloxanes with organosilicon compounds containing silicon-bonded hydrolyzable groups. Preferred additives impart increased working time to the composition without any substantial reduction in cure rate.

2. Background Information

The prior art describes organosiloxane compositions that cure to yield crosslinked elastomers and other useful products in the presence of moisture by the reaction of polyorganosiloxanes containing at least two silanol groups per molecule with organosilicon compounds containing at least three silicon-bonded alkoxy or other hydrolyzable groups per molecule as the curing agent. This reaction is typically catalyzed by tin compounds or organotitanium compounds.

When the curing agent is an alkoxy silane and the curing catalyst is a tin compound the reactive ingredients of these compositions are typically packaged in two containers with the curing agent and curing catalyst in one container and the silanol-containing polyorganosiloxane in a second container. The curing reaction occurs when the contents of the two containers are combined in the presence of atmospheric moisture.

The time interval over which the composition can be fabricated by pouring, molding, extrusion, calendaring or other known shaping technique is referred to in the art as the "working time" of the composition.

The length of time over which the portion of the composition containing the silanol-terminated polyorganosiloxane can be stored without exhibiting a substantial increase in viscosity is referred to in the art as "storage stability".

For certain applications such as mold making it would be desirable to prepare relatively large batches of curable material containing all of the reactive ingredients, including the curing agent and curing catalyst, and have the material remain workable over a relatively long time period by delaying the initiation of the curing reaction without substantially decreasing the rate of this reaction once it begins.

SUMMARY OF THE INVENTION

The present invention is based on the discovery that a small amount of unreacted liquid silanol terminated polydiorganosiloxane extends the working time of tin-catalyzed moisture curable organosiloxane compositions without substantially increasing the cure rate of the composition or adversely affecting the physical properties of cured materials, particularly elastomers, prepared using these compositions.

DETAILED DESCRIPTION OF THE INVENTION

This invention provides a curable organosiloxane composition comprising

A) a liquid curable polyorganosiloxane containing at least two silanol groups per molecule;

B) as the curing agent for said composition, an organosilicon compound containing at least three silicon-bonded hydrolyzable groups per molecule, wherein the concentration of said curing agent is sufficient to cure said polyorganosiloxane in the presence of moisture;

C) as the curing catalyst, a tin compound at a concentration sufficient to promote curing of said composition in the presence of moisture; and D) a silanol-terminated polydiorganosiloxane having a number average molecular weight less than 1000 at a concentration of at least 0.6 weight percent, based on the weight of said composition.

This invention also provides a method for extending the working time of organosiloxane compositions that cure by the reaction of a liquid silanol-functional polyorganosiloxane with an organosilicon compound containing silicon-bonded hydrolyzable groups in the presence of moisture and a tin compound as the curing catalyst. The method comprises including as an ingredient of the curable composition at least 0.6 weight percent of a silanol-functional polydiorganosiloxane exhibiting a molecular weight of less than 1000.

The Working Time Extender (Ingredient D)

The distinguishing characteristic of the present compositions is the presence of at least 0.6 weight percent, based on the weight of said composition, of a low molecular weight liquid silanol-functional polydiorganosiloxane, referred to hereinafter as ingredient D, that extends the working time of the curable composition. This ingredient has also been shown by the present inventors to lengthen the time period during which a mixture of the curable polyorganosiloxane, referred to hereinafter as ingredient A, and a reinforcing filler, typically a finely divided form of silica, can be stored without exhibiting any substantial increase in viscosity resulting from an interaction between ingredient A and the reinforcing filler referred to as "creping" or "crepe hardening". This phenomenon is characterized by a substantial increase in viscosity of silica-filled organosiloxane compositions following blending, and is believed due to interaction between hydroxyl groups present on the filler and curable hydroxyl-substituted polyorganosiloxanes.

The number average molecular weight of ingredient D is less than 1000, preferably from 500 to 1000. This molecular weight is too low to form a cured material with any useful level of physical properties if it were to be reacted with the curing agent portion of the present compositions as the only silanolfunctional polyorganosiloxane present in the composition.

Liquid silanol terminated polydiorganosiloxanes of the type useful as ingredient D are often used as filler treating agents for curable organosiloxane compositions to prevent or minimize creping.

The organic groups bonded to the silicon atoms of ingredient D are monovalent unsubstituted or substituted hydrocarbon radicals that preferably contain from 1 to about 6 carbon atoms.

Polydiorganosiloxanes suitable for use as ingredient D can be represented by the formula $HO[(R^1)_2SiO]_nH$. In this formula the two hydrocarbon radicals represented by $R^1$ are individually selected from monovalent substituted and unsubstituted hydrocarbon radicals and n represents a degree of polymerization equivalent to a number average molecular weight of less than 1000.

Hydrocarbon radicals that can be represented by $R^1$ include but are not limited to alkyl such as methyl and ethyl, substituted alkyl such as chloromethyl and 3,3,3- trifluoropropyl, cycloalkyl such as cyclohexyl, aryl such as phenyl, and aralkyl such as benzyl.

Preferably at least one of the two hydrocarbon radicals represented by $R^1$ is a methyl radical and the remaining hydrocarbon radical is methyl, phenyl or 3,3,3-trifluoropropyl. Preferably at least 80 percent of the hydrocarbon radicals represented by $R^1$ are the same as the hydrocarbon radicals present in ingredient A to ensure compatibility of these two ingredients. These hydrocarbon radicals are preferably methyl.

The concentration of ingredient D is typically from 0.6 to about 10 weight percent, preferably from 1 to 5 percent, based on the total weight of the present curable organosiloxane composition.

The Moisture Curable Organosiloxane (Ingredient A)

Organosiloxane compositions suitable for use with the present working time extenders cure in the presence of atmospheric moisture by the reaction of a liquid or gum type polyorganosiloxane containing at least two silanol groups with an organosilicon compound containing at least three silicon-bonded alkoxy or other hydrolyzable groups.

The curable polyorganosiloxanes referred to in this specification as ingredient A contain at least two silanol groups per molecule and can exhibit a linear or branched structure. Preferred polyorganosiloxanes are liquids at 25° C.

The repeating units of ingredient A can be represented by the general formula $R^2_b SiO_{4-b/2}$, where $R^2$ represents an unsubstituted or substituted monovalent hydrocarbon radical and b is 1 or 2. When b is 2 the hydrocarbon radicals represented by $R^2$ can be identical or different. This ingredient can contain one, two or more different types of repeating units.

To achieve a useful level of tensile strength and other physical properties in the cured material the number average molecular weight of ingredient A should be at least 20,000, preferably from 25,000 to 75,000. The viscosity of polyorganosiloxanes with number average molecular weights above about 100,000 are typically too viscous for convenient processing, particularly blending with the other ingredients of the present compositions using conventional mixing equipment.

The Curing Agent (Ingredient B)

Curing agents for the polyorganosiloxanes referred to as ingredient A of the present moisture curable compositions are typically organosilicon compounds containing an average of at least three silicon-bonded hydrolyzable groups per molecule. Preferred hydrolyzable groups are alkoxy containing from 1 to about 4 carbon atoms, acetoxy and ketoximo such as methylethylketoximo.

The curing agent, referred to hereinafter as ingredient B, can be a silane, disiloxane or a polyorganosiloxane. Silanes are generally preferred, based on their cost and availability. Preferred silanes include but are not limited to methyltrimethoxysilane, phenyl trimethoxysilane, methyltriethoxysilane, methyltriacetoxysilane, methyltri(methylethylketoximo)silane, alkyl orthosilicates such as tetraethyl orthosilicate and condensation products of these orthosilicates, which are typically referred to as alkyl polysilicates.

The concentration of curing agent should be sufficient to convert the composition to an elastomeric or resinous material exhibiting the desired physical properties in the presence of moisture. Typical moisture curable compositions contain from 0.5 to 6 weight percent of alkoxy or other hydrolyzable group based on the total weight of the curable composition.

The Curing Catalyst (Ingredient C)

In addition to the curable polyorganosiloxane and curing agent, the curable composition includes a tin-containing catalyst to promote hydrolysis of the hydrolyzable groups present on the curing agent in the presence of moisture. Useful catalysts include but are not limited to divalent tin salts of carboxylic acids such as stannous acetate and stannous octoate and organotin compounds such as dimethyltin dineodecanoate, dibutyltin diacetate, dibutyltin dilaurate and dioctyltin diacetate. The carboxylic acid portion of these tin compounds contain from 1 to 20 carbon atoms.

The concentration of curing catalyst appears critical to achieving a practical cure rate following the inhibition period resulting from the presence of the working time extender. In preferred curable compositions of the present invention the concentration of catalyst is from 0.5 to about 5 weight percent, based on the weight of the curable polyorganosiloxane (ingredient A).

One advantage of using the present working time extenders is the ability to increase the concentration and/or the activity of the catalyst as required to achieve a more rapid cure rate and still achieve the desired extended working time prior to initiation of the curing reaction without adversely affecting the storage stability of the composition.

Optional Ingredients

In addition to ingredients referred to as A, B, C and D, the present compositions can contain additional ingredients to modify the properties of the curable composition or cured materials prepared using this composition. These additional ingredients include but are not limited to liquid diluents, reinforcing fillers such as finely divided silica of the fume or precipitated type, non-reinforcing fillers such as quartz and calcium carbonate, water to accelerate curing, surfactants, stabilizers to inhibit degradation in the presence of heat and/or ultraviolet light, anti-oxidants, dyes, pigments and flame retardants. Non-reactive polyorganosiloxanes are a preferred class of diluents.

Preparation and Curing of Curable Compositions

The curable compositions of this invention are prepared by blending all of the ingredients together. Curing begins when the composition is exposed to moisture, and requires from several minutes to several hours, depending upon the relative humidity in the curing environment, the temperature, and the type and concentration of curing catalyst and working time extender.

Using preferred working time extenders initiation of the curing reaction can be delayed up to about 8 hours with commercially useful curing times. While longer working times can be achieved by increasing the concentration of working time extender (ingredient D of the present compositions) the accompanying increase in cure time is typically so large as to make the compositions impractical for many commercial applications.

When it is desired to prepare the present compositions more than one or two days prior to curing them, the compositions are preferably stored in two containers, one of which contains ingredients A, D and any water. The curing agent and curing catalyst are packaged in a separate container. Fillers and other optional ingredients can be packaged in either or both containers, so long as these are substantially free of water.

The elastomers prepared using the present compositions are suitable for use in a variety of end use applications, including sealants, coating materials and as pottants or encapsulants for electrical and electronic devices. The compositions are particularly useful for preparing molds.

EXAMPLES

The following examples describe preferred curable compositions of the present invention, and should not be interpreted as limiting the invention defined in the accompanying claims. Unless otherwise indicated all parts and percentages in the examples are by weight and viscosities are the values measured at 25° C.

Example 1

This example demonstrates the increase in working time that can be achieved using a working time extender of the present invention.

The base portion of a curable organosiloxane composition was prepared by blending the following ingredients to homogeneity:

42 parts of a silanol-terminated polydimethylsiloxane exhibiting a viscosity of 50 Pa.s;
21 parts of a trimethylsiloxy-terminated polydimethylsiloxane exhibiting a viscosity of 0.325 Pa.s;
3 parts of hexamethyldisilazane;
21 parts of a precipitated silica exhibiting an average particle size of 4 microns;
1 part of water;
11 parts of zirconium silicate exhibiting an average particle size of 5 microns;
42 parts of a silanol-terminated polydimethylsiloxane exhibiting a viscosity of 10 Pa.s;
0.8 part of an emulsion prepared by blending 35 parts of water, 60 parts of a liquid trimethylsiloxyterminated polydimethylsiloxane exhibiting a viscosity of 0.35 Pa.s, 4 parts of a non-ionic surfactant, 2,6,8-trimethyl-4-nonyloxypolyethyleneoxyethanol, and 1 part of sodium polyethylene oxide octylphenoxy sulfonate.

A curing agent/catalyst mixture was prepared by blending 7 parts of a trimethylsiloxy-terminated polydimethylsiloxane exhibiting a viscosity of 0.05 Pa.s, 2 parts of ethyl polysilicate, 0.6 part of dibutyltin dilaurate and 0.5 part of a green pigment. Curable compositions were prepared by adding 1 part of this mixture to the base portion of the compositions, which is equivalent to 0.6 weight percent of the catalyst based on the weight of the curable composition.

The silanol-terminated polydimethylsiloxane used to extend the working time of the compositions exhibited a number average molecular weight of about 850. This polymer will be referred to hereinafter as the "working time extender". The working time extender was added to the other ingredients of the curable composition as a 15 weight percent solution in a 1:1 weight ratio mixture of two trimethylsiloxy-terminated polydimethylsiloxanes, one of which had a viscosity of 0.05 Pa.s and the second a viscosity of 0.02 Pa.s.

Curable compositions of this invention were prepared by blending to homogeneity 10 parts of the base with 1 part of the curing agent/catalyst mixture and then adding the amounts of working time extender solution reported in Table 1.

The viscosity of the initial compositions were measured using a Brookfield model HAF viscometer equipped with a number 6 spindle. The compositions were allowed to stand at a temperature of 25° C. and a relative humidity of 50%±5%. The viscosity measurement was repeated at the time intervals reported in Table 1. The time intervals are measured from the preparation of the curable composition The time interval required for the viscosity of each of the compositions to reach a viscosity 1.5 Pa.s, a practical upper limit for workability, is also reported in Table 1.

To determine the effect of the concentration of working time extender on the physical properties of cured elastomers prepared using the curable compositions, each of the compositions was allowed to cure as a 0.15 cm.—thick slab for two weeks at a temperature of 25° C. and a relative humidity of 50 percent.

The specimens required for the ASTM test procedures for measuring tensile strength, tear strength, and durometer hardness were cut from each of the cured slabs. The properties of the elastomers are summarized in Table 2.

TABLE 1

| Viscosity (Pa · s) After X Minutes, X = | Working Time Extender (Wt. %)* | | | |
|---|---|---|---|---|
| | 0 | 0.6 | 1.2 | 1.8 |
| 0 | 23 | 17 | 19 | 9 |
| 7 | 23 | 17 | 19 | 9 |
| 30 | 34 | 20 | 20 | 10 |
| 75 | 133 | 26 | 23 | 11 |
| 120 | Gel | 39 | 28 | 12 |
| 190 | | 400 | 400 | 15 |
| 225 | | Gel | 62 | 18 |
| 285 | | | 150 | 21 |
| 340 | | | Gel | 71 |
| 370 | | | | 250 |
| 375 | | | | 4000 |
| Additional Working Time (Minutes)** | 0 | 90 | 170 | 275 |

*Actual weight of working time extender. Extender added as a 15 weight percent solution in a mixture of two trimethylsiloxyterminated polydimethylsiloxanes with a combined viscosity of about 0.03 Pa · s
**Time required to attain a viscosity of 150 Pa · s

TABLE 2

| Working Time Extender (wt %)* | Tensile Strength (Mpa) | Tear Strength Kn/M | Durometer Shore A Scale |
|---|---|---|---|
| 0 | 2.28 | 21.5 | 23 |
| 0.6 | 2.44 | 21.5 | 21 |
| 1.2 | 2.31 | 17.3 | 17 |
| 1.8 | 2.13 | 13.3 | 12 |

To demonstrate the effect of a low catalyst concentration on the working time and cure rate of an organosiloxane composition of the present invention, a curable composition containing 0.31 weight percent of dibutyltin dilaurate was prepared and evaluated. This is below the preferred lower catalyst concentration limit of 0.5 percent, based on the weight of the curable composition.

The base portion was the same one described in the preceding section of this example and the curing agent/catalyst mixture contained the following ingredients:

76 parts of a trimethylsiloxy-terminated polydimethylsiloxane exhibiting a viscosity of 0.05 Pa.s;
20 parts of tetraethyl orthosilicate
3.4 parts of dibutyltin dilaurate and
0.25 part of a red dye, A mixture of 10 parts of the base with 1 part of this curing agent/catalyst mixture contained 0.31 weight percent of the catalyst.

This curable composition was combined with 3, 6, or 9 weight percent of the 15 weight percent solution of the working life extender described in the preceding section of this example. The resultant mixture was blended to homogeneity. The time required for the composition to achieve a viscosity of 150 Pa.s at a temperature of 25° C. and a relative humidity of 50±5 percent is recorded in Table 3.

TABLE 3

| Working Time Extender (%)* | Time To Achieve 150 Pa · s Viscosity (Minutes) |
|---|---|
| 0 | 71 |
| .45 | 164 |
| 0.9 | 304 |
| 1.35 | 1550 |

The compositions required about 1–3 days to develop a dry, non-tacky surface and about 4–10 days to cure completely, which would not be acceptable for a commercial scale operation.

Example 2

This example demonstrates the increase in storage stability and working time for compositions of different initial viscosities that can be achieved using a working time extender of the present invention.

Two batches of a base portion of a curable organosiloxane composition containing types and amounts of ingredients described in Example 1 were prepared without the addition of a working time extender. These will be referred to hereinafter as batches 1 and 2. Four months after being prepared the viscosity of each batch of base was measured as described in Example 1. The viscosity of batch 1 was 53 Pa.s and the viscosity of batch 2 was 44.5 Pa.s. At this time 2 weight percent of a working time extender was added to a portion of each batch and the four compositions were stored under ambient conditions for 6 months, at which time the viscosity measurments were repeated. The viscosities are recorded in Table 4. The working time extender was a silanol-terminated polydimethylsiloxane exhibiting a number average molecular weight of about 850.

Thirty five days following addition of the working time extender 10 parts of each of the four base compositions were blended with 1 part of a curing agent-/catalyst mixture prepared by blending 7 parts of a trimethylsiloxy-terminated polydimethylsiloxane exhibiting a viscosity of 0.05 Pa.s, 2 parts of ethyl polysilicate, 0.6 part of dibutyltin dilaurate and 0.5 part of a green pigment. The curable compositions contained 1.4 weight percent of the catalyst based on the weight of the curable composition.

The working time of each of the curable compositions was determined by measuring the time required for the viscosity of the compositions to reach a value of 50 Pa.s. This time interval is recorded in Table 5.

TABLE 4

| Storage Stability of Base Portions | | |
|---|---|---|
| | Composition 1 | Composition 2 |
| Initial Viscosity* | 53.0 Pa · s | 44.5 Pa · s |
| Final Viscosity** | | |
| 0% Extender | 130 Pa · s | 90 Pa · s |
| 2% Extender | 51 Pa · s | 40 Pa · s |

*Measured four month following preparation of base portion
**Measured six months following addition of extender and ten months following preparation of base portion.

TABLE 5

| Working Time Extender (%) | Working Time (Minutes) | |
|---|---|---|
| | Composition 1 | Composition 2 |
| 0 | 40 | 50 |
| 2 | 180 | 180 |

That which is claimed is:

1. A curable organosiloxane composition comprising
A) a liquid curable polyorganosiloxane containing at least two silanol groups per molecule and exhibiting a number average molecular weight of at least 20,000;
B) as the curing agent for said composition, an organosilicon compound containing at least three siliconbonded hydrolyzable groups per molecule, wherein the concentration of said curing agent is sufficient to cure said polyorganosiloxane in the presence of moisture;
C) as the curing catalyst, a tin compound at a concentration sufficient to promote curing of said composition in the presence of moisture; and
D) as a working time extender, at least 0.6 weight percent, based on the weight of said composition, of a silanolterminated polydiorganosiloxane having a number average molecular weight less than 1000.

2. A composition according to claim 1 wherein said working time extender exhibits the general formula $HO[(R^1)_2SiO]_nH$, the two $R^1$ substituents on each silicon atom are individually selected from monovalent substituted and unsubstituted hydrocarbon radicals and n represents a degree of polymerization equivalent to a number average molecular weight of less than 1000; the concentration of said working time extender is from 0.6 to about 10 weight percent, based on the total weight of said composition; the repeating units of said curable polyorganosiloxane correspond to the formula $R^2_bSiO_{4-b/2}$, wherein $R^2$ represents an unsubstituted or substituted monovalent hydrocarbon radical and b is 1 or 2.

3. A composition according to claim 2 wherein the number average molecular weight of said working time extender is at least 500; at least one of the two hydrocarbon radicals bonded to each silicon atom of said working time extender and said curable polyorganosiloxane is methyl and the remaining hydrocarbon radicals are selected from the group consisting of methyl, phenyl and 3,3,3-trifluoropropyl; the concentration of said working time extender is from 1 to 5 weight percent, based on the weight of said composition; the hydrolyzable groups present on said curing agent contain from 1 to 6 carbon atoms and are selected from the group consisting of alkoxy, carboxy and ketoximo; the concentration of hydrolyzable groups in said curing agent constitute from 0.5 to 6 weight percent, based on the weight of said composition; said curing catalyst is selected from the group consisting of divalent tin salts of carboxylic acids and organotin compounds and constitutes from 0.5 to 5 weight percent of said composition.

4. A composition according to claim 3 wherein the number average molecular weight of said curable polyorganosiloxane is from 25,000 to 75,000; said curing agent is selected from the group consisting of alkoxysilanes and alkyl polysilicates, and said curing catalyst is a dialkyltin salt of a carboxylic acid.

5. A composition according to claim 1 wherein said composition is packaged in two containers, the contents of a first container comprising said working time extender and said curable polyorganosiloxane, and the contents of a second container comprising said curing agent and said curing catalyst.

6. In a method for extending the working time of an organosiloxane composition by combining a liquid silanol functional polyorganosiloxane with a organosilicon compound curing agent containing silicon bonded hydrolyzable groups in the presence of moisture and a tin compound as the curing catalyst, the improvement comprising adding as a working time extender to the composition at least 0.6 weight percent, based on the weight of the composition, of a silanol-terminated polydiorganosiloxane having a number average molecular weight less than 1000.

7. A method according to claim 6 wherein said polydiorganosiloxane exhibits the general formula $HO[(R^1)_2SiO]_nH$, the two $R^1$ substituents on each silicon atom are individually selected from monovalent substituted and unsubstituted hydrocarbon radicals and n represents a degree of polymerization equivalent to a number average molecular weight of less than 1000; the concentration of said polydiorganosiloxane is from 0.6 to about 20 weight percent, based on the total weight of said composition; the repeating units of said curable polyorganosiloxane correspond to the formula $R^2_bSiO_{4-b/2}$, wherein $R^2$ represents an unsubstituted or substituted monovalent hydrocarbon radical and b is 1 or 2.

8. A method according to claim 7 wherein the number average molecular weight of said polydiorganosiloxane is at least 500; at least one of the two hydrocarbon radicals bonded to each silicon atom of said polydiorganosiloxane and said curable polyorganosiloxane is methyl and the remaining hydrocarbon radicals are selected from the group consisting of methyl, phenyl and 3,3,3trifluoropropyl; the concentration of said polydiorganosiloxane working time extender is from 1 to 5 weight percent, based on the weight of said composition; the hydrolyzable groups present on said curing agent contain from 1 to 6 carbon atoms and are selected from the group consisting of alkoxy, carboxy and ketoximo; the concentration of hydrolyzable groups in said curing agent constitute from 0.5 to 6 weight percent, based on the weight of said composition; said curing catalyst is selected from the group consisting of divalent tin salts of carboxylic acids and organotin compounds and constitutes from 0.5 to 5 weight percent of said composition.

9. A method according to claim 8 wherein the number average molecular weight of said curable polyorganosiloxane is from 25,000 to 75,000; said curing agent is selected from the group consisting of alkoxysilanes and alkyl polysilicates, and said curing catalyst is a dialkyltin salt of a carboxylic acid.

* * * * *